United States Patent
Sano et al.

[19]

[11] Patent Number: 5,822,455
[45] Date of Patent: Oct. 13, 1998

[54] LINEAR LINE DETECTION APPARATUS USING PROJECTION IMAGE OF CHARACTER STRING INCLUDING LINEAR LINE

[75] Inventors: Tikara Sano, Hiratsuka; Yoshikatu Nakamura, Yokosuka, both of Japan

[73] Assignee: Kabushiki Kaisha Toshiba, Kawasaki, Japan

[21] Appl. No.: 570,973

[22] Filed: Dec. 12, 1995

[30] Foreign Application Priority Data

Dec. 12, 1994 [JP] Japan .................................. 6-307324
Jul. 25, 1995 [JP] Japan .................................. 7-189248

[51] Int. Cl.$^6$ .............................. G06K 9/00; G06K 9/46
[52] U.S. Cl. .......................... 382/202; 382/170; 382/101
[58] Field of Search .................................. 382/170, 171, 382/172, 174, 177, 179, 202, 101, 102

[56] References Cited

U.S. PATENT DOCUMENTS

| 4,251,799 | 2/1981 | Jih .............................................. 382/174 |
| 4,377,803 | 3/1983 | Lotspiech et al. ...................... 382/171 |
| 4,633,502 | 12/1986 | Namba ........................................ 382/9 |
| 5,391,889 | 2/1995 | Nishijima et al. ........................ 250/555 |
| 5,557,689 | 9/1996 | Huttenlocher et al. ................. 382/177 |

OTHER PUBLICATIONS

Shimada et al, "A Recognition Algorithm of Dashed and Chained Lines for Automatic Inputting of Drawings", Systems and Computers in Japan, vol. 18, No. 6, 1987, pp. 25–37.

Shridhar et al, "Recognition of Isolated and Simply Connected Handwritten Numerals", Pattern Recognition, vol. 19, No. 1, 1986, pp. 1–12.

*Primary Examiner*—Yon J. Couso
*Assistant Examiner*—Ha Tran Nguyen
*Attorney, Agent, or Firm*—Cushman Darby & Cushman IP Group of Pillsbury Madison & Sutro LLP

[57] ABSTRACT

A line image detection apparatus having an image input function for inputting an image on a document. The image includes a rectangular character string and a linear line drawn along the character string. The line detection apparatus has a function for detecting a character string image from the image, a function for forming a projection image on the basis of the distance from a lower end of the character string image to each first black pixel found in the character string image in the vertical direction, and a function for comparing the distance from the lower end of the character string image to each first black pixel, with a predetermined threshold value, thereby to define a plurality of "slice 0" areas included in the projection image. The distance, in each of the "slice 0" areas, from the lower end of the character string image to each first black pixel is lower than the predetermined threshold value. The apparatus also includes a function for determining an interval distribution of the interval between each adjacent pair of the "slice 0" areas determined by an area determination means, and a function for detecting the linear line on the basis of the interval distribution.

25 Claims, 11 Drawing Sheets

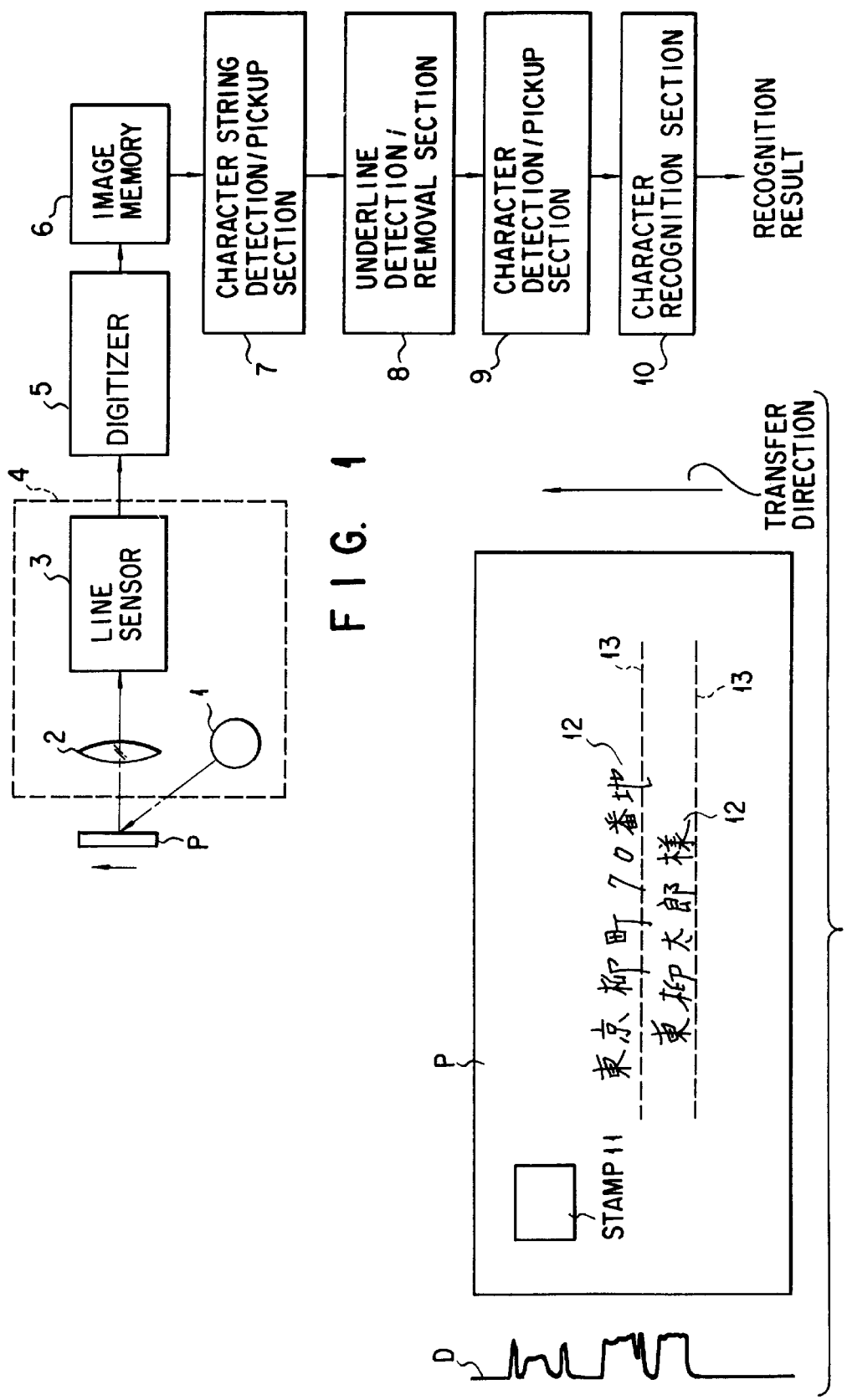

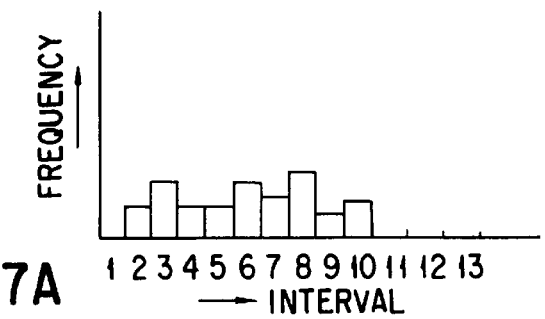

HISTOGRAM CONCERNING INTERVAL P(m) BETWEEN CENTER POINTS g(m) OF ADJACENT "SLICE 0" AREAS IN CHARACTER AREA WITH NO BROKEN LINE

F I G. 7A

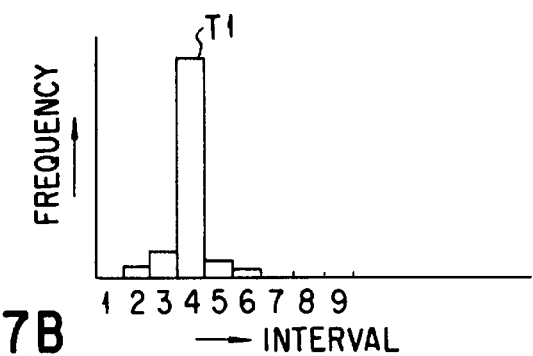

HISTOGRAM CONCERNING INTERVAL P(m) BETWEEN CENTER POINTS g(m) OF ADJACENT "SLICE 0" AREAS IN CHARACTER AREA WITH BROKEN LINE (FIG. 6B)

F I G. 7B

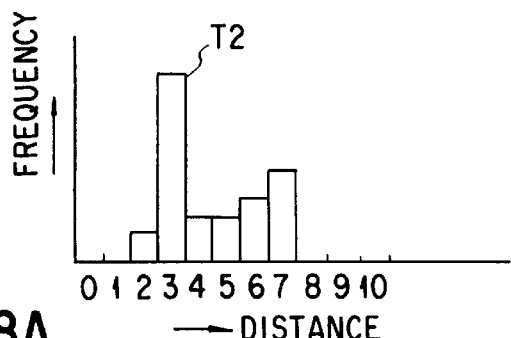

HISTOGRAM CONCERNING DISTANCE F(n) FROM LOWER END TO BLACK PIXEL IN CHARACTER AREA WITH NO SOLID LINE

F I G. 8A

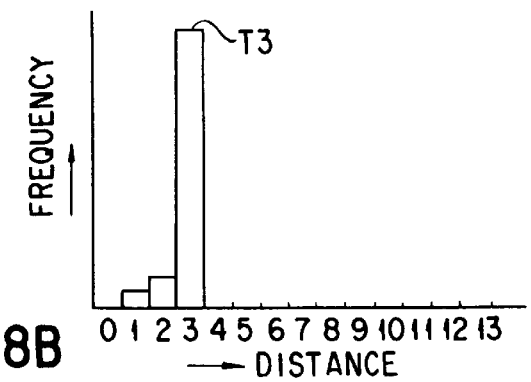

HISTOGRAM CONCERNING DISTANCE F(n) FROM LOWER END TO BLACK PIXEL IN CHARACTER AREA WITH SOLID LINE

F I G. 8B

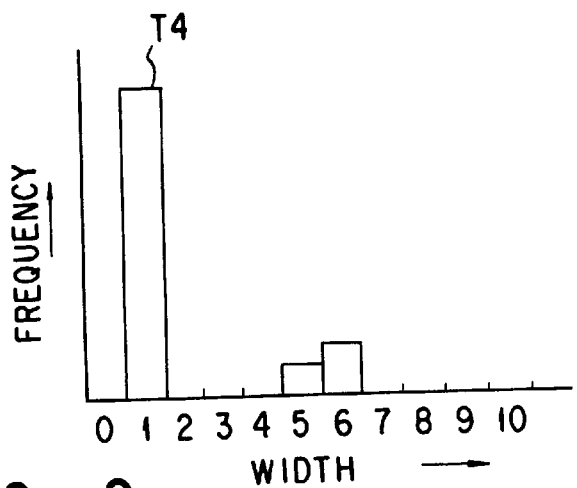
HISTOGRAM CONCERNING WIDTH OF FIRST BLACK PIXELS FOUND IN VERTICAL DIRECTION BY SCANNING STARTED FROM LOWER END
F I G. 9
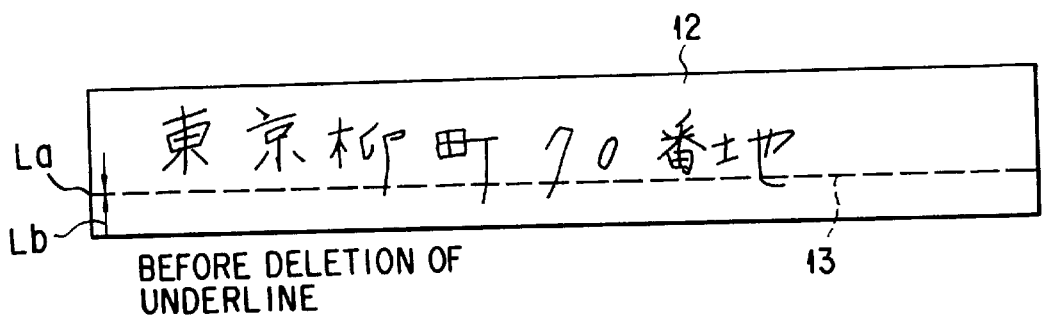
BEFORE DELETION OF UNDERLINE
F I G. 10A
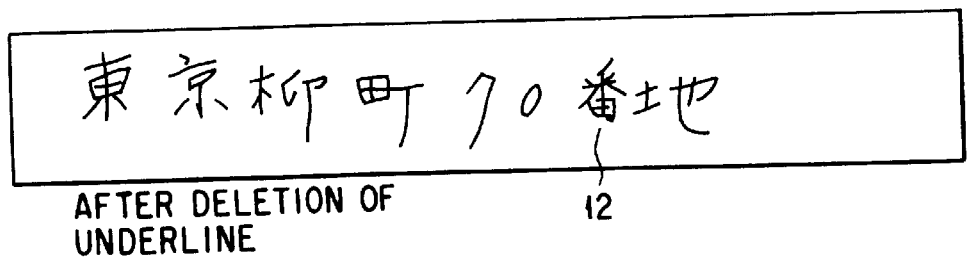
AFTER DELETION OF UNDERLINE
F I G. 10B

LINEAR LINE DETECTION APPARATUS USING PROJECTION IMAGE OF CHARACTER STRING INCLUDING LINEAR LINE

BACKGROUND OF THE INVENTION

1. Field of the Invention

This invention relates to a linear line detection apparatus for use in an address reading apparatus for reading address data on a postal matter, capable of detecting a line (solid or broken line) drawn just under an address character string as address data recited in the address area of the postal matter.

This invention also relates to a linear line removal apparatus for detecting and removing the underline of the address character string.

This invention further relates to an address area determination apparatus for determining the address area from the detected underline.

2. Description of the Related Art

There is a case in which an address character string, as address data recited in the address area of a postal matter, is underlined with a long linear solid (or broken) line. To optically read such an underlined address character string, it is necessary to remove the underline of the character string so as to facilitate character detection/pickup processing for picking up the characters of the character string one by one.

In the conventional underline removal method disclosed, for example, in U.S. Pat. No. 4,633,502, horizontal projection data which is parallel to an address character string (character row) is prepared and used to detect and remove a line drawn under the character string. In this method, the underline can be detected and removed only when an underline portion and a character string portion in the projection data are clearly separated from each other.

On the other hand, if lower portions of some of the characters contact the underline, or if the character string inclines and contacts the underline, the character string portion and the underline portion in the projection data cannot clearly be separated from each other. As a result, the underline cannot be detected and removed, thereby disabling detection/pickup of characters and hence recognition thereof.

SUMMARY OF THE INVENTION

It is an object of the invention to provide a linear line detection apparatus capable of efficiently and reliably detecting a linear line drawn along a character string even if the linear line is a solid line or a broken line, or contains a cut portion due to noise.

It is another object of the invention to provide a character recognition apparatus capable of efficiently and reliably detecting and removing the linear line, thereby accurately determining an address area of a document and accurately recognizing characters in the address area.

According to a first aspect of the invention, there is provided a line image detection apparatus comprising: means for inputting an image on a document, which image includes a rectangular character string and a linear line drawn along the character string; means for detecting and picking up, from the image, a character string image including the character string and the linear line which are constituted by black pixels; means for forming a projection image on the basis of the distance from a lower end of the character string image to each first black pixel found in the character string image in the vertical direction; means for comparing the distance from the lower end of the character string image to each first black pixel, with a predetermined threshold value so as to define a plurality of "slice 0" areas included in the projection image, the distance, in each of the "slice 0" areas, from the lower end of the character string image to each first black pixel being lower than the predetermined threshold value; means for determining an interval distribution of the interval between each adjacent pair of the "slice 0" areas; and means for detecting the linear line on the basis of the interval distribution.

According to a second aspect of the invention, there is provided a line image detection apparatus comprising: means for inputting an image on a document, which image includes a rectangular character string and a linear line drawn along the character string; means for detecting and picking up, from the image, a character string image including the character string and the linear line which are constituted by black pixels; means for preparing, on the basis of the character string image, projection data items respectively indicating an image of a first area which extends from the left end of the character string image to a first position, and an image of a second area which extends from the right end of the character string image to a second position; means for comparing the vertical width of the projection image of each of the first and second areas with the vertical width of the character string; and means for determining that the character string is underlined, when the ratio of the vertical width of the projection image to the vertical width of the character string is lower than a predetermined value.

The line image detection apparatus according to the first aspect of the invention can detect a broken line contained in a character string image. Specifically, in this apparatus, a projection image of the character string projected from below the character string is prepared. If the character string is underlined with a broken line, the projection image contains that image of the broken line (a so-called silhouette of the broken line), which includes image portions arranged at regular intervals near the lower end of the projection image. Therefore, the broken line can be recognized by detecting whether there are image portions arranged at regular intervals (with a certain pitch).

To this end, a plurality of areas in which black pixels are continuously arranged near the lower end of the character string image are detected, thereby calculating the center point of each of the areas and then the interval between the center points of each adjacent pair of the areas. Thereafter, a histogram concerning the interval is prepared. If concentration of frequency is found in the histogram, it is determined that the projection image contains image portions arranged at regular intervals and hence that a broken line exists. Thus, the existence of a broken line is determined by detecting the degree of concentration of frequency in the histogram.

The line image detection apparatus according to the second aspect of the invention can detect a linear line contained in a character string image in the following manner. Suppose that a line (solid or broken line) exists in the address area of a postal matter, and characters are to be drawn just above the line. Since in this case, in general, no characters are drawn above opposite end portions of the line, the opposite end portions of the line (i.e. the underline) can be detected without being influenced by a character image. In light of this, projection data items concerning areas, which extend a predetermined distance from the opposite ends of the character string image and include end portions of the linear line, are prepared. If only an underline portion exists in each of the opposite end portions of the image, the vertical width contained in each of the projection data items can be extremely narrower compared to the vertical width of the character string. Therefore, if the vertical width contained in each projection item is, for example, 10% or less of the vertical width of the character string, it is determined that the character string is underlined with a solid or broken line.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a schematic block diagram, showing a character reading apparatus to which linear line detection and removal apparatuses according to a first embodiment of the invention are applied;

FIG. 2 is a view, showing a postal matter to be read, and horizontal projection data corresponding to the postal matter;

FIG. 7A is a histogram concerning the interval between the center points of each pair of adjacent "slice 0" areas in a character string image which does not contain a broken line;

FIG. 7B is a histogram concerning the interval between the center points of each pair of adjacent "slice 0" areas in a character string image which contains a broken line as shown in FIG. 6B;

FIG. 8A is a histogram concerning the distances between the lower end of a character string image with no solid line and black pixels of the image;

FIG. 8B is a histogram concerning the distances between the lower end of a character string image with a solid line and black pixels of the image;

FIG. 9 is a histogram concerning those first black pixels from the lower end of the character string image, which are arranged on a continuous basis;

FIG. 10A shows an example of a character string image obtained before the underline is removed;

FIG. 10B shows an example of a character string image obtained after the underline is removed;

DETAILED DESCRIPTION OF THE PREFERRED EMBODIMENTS

Figure 3:
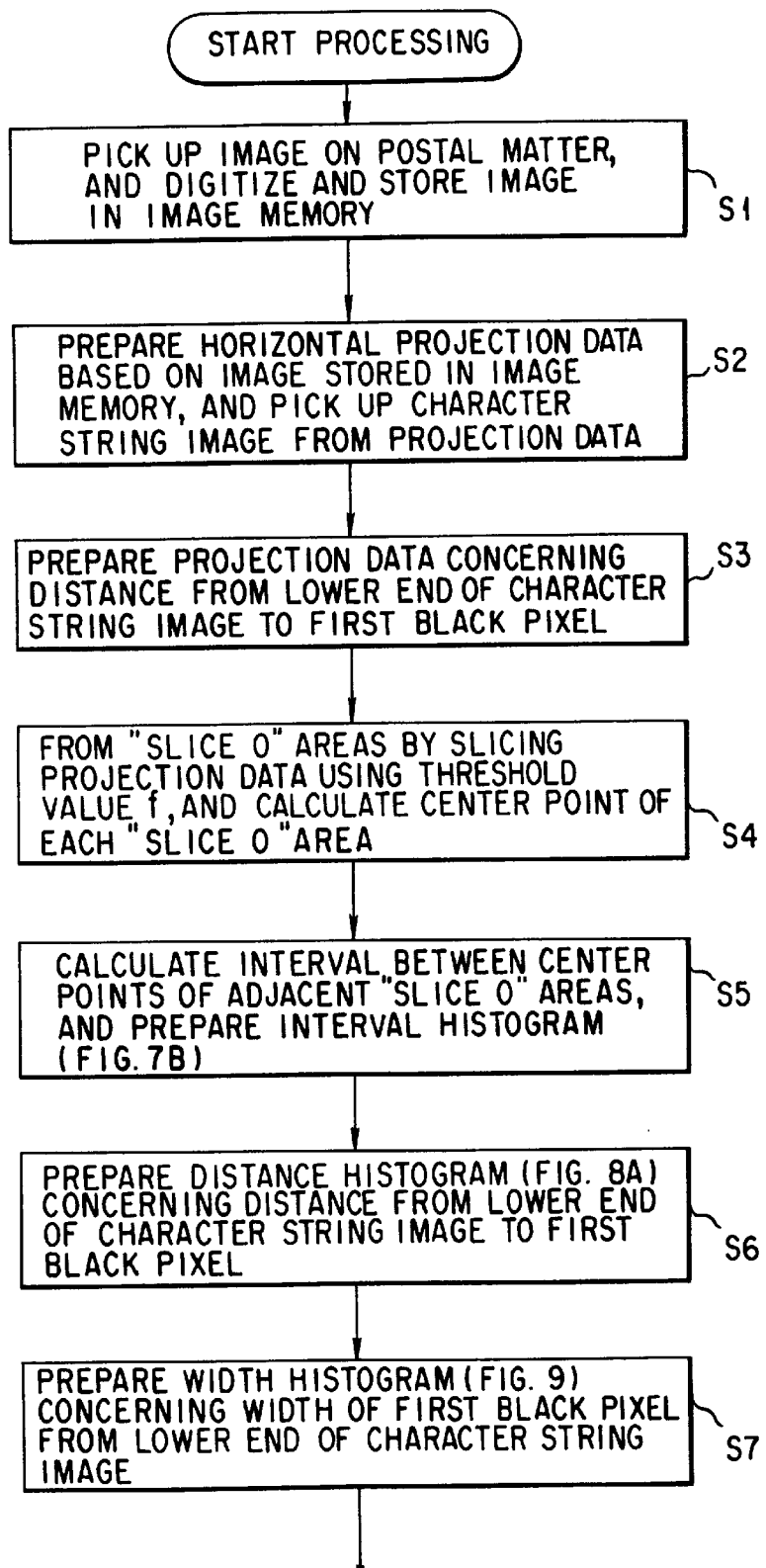
FIGS. 3 and 4 show a flowchart useful in explaining the operation of the apparatus of FIG. 1.

The embodiments of the invention will be explained with reference to the accompanying drawings.

First, a first embodiment will be explained.

FIG. 1 is a schematic block diagram, showing a character reading apparatus used as an address reading apparatus for reading address data on a postal matter, to which linear line detection and removal apparatuses according to a first embodiment of the invention are applied. Specifically, the character reading apparatus comprises a light source 1 for illuminating a to-be-read postal matter P transferred in a direction indicated by the arrow; an optical system 2 such as a lens; a CCD-type line sensor 3 provided perpendicular to the direction of transfer of the postal matter P; an image input section 4 serving as image input means for inputting an image on the postal matter P, which image includes an address character string and a line drawn under the character string; a digitizing section 5 for digitizing a signal output from the line sensor 3; an image memory 6 for storing digitized image data output from the digitizing section 5; a character string detection/pickup section 7 for detecting and picking up, from the image data stored in the image memory 6, an image of the character string (i.e. the character row) including the underline; an underline detection/removal section 8 for detecting the underline in the picked character string image and removing the same; a character detection/pickup section 9 for picking up characters one by one from the character string with no underline; and a character recognition section 10 for recognizing each character picked by the character detection/pickup section 9.

FIG. 2 shows an example of a postal matter P. As is shown in FIG. 2, a stamp 11 is attached to the major surface of the postal matter P, and address character strings 12 and underlines (in this case, broken lines) 13 are printed horizontally. In this case, suppose that the postal matter P is transferred with the address character strings 12 and the underlines 13 positioned perpendicular to the path of transfer, and that some portions of the character strings 12 contact one of the underlines 13 as shown in FIG. 2.

Figure 4:
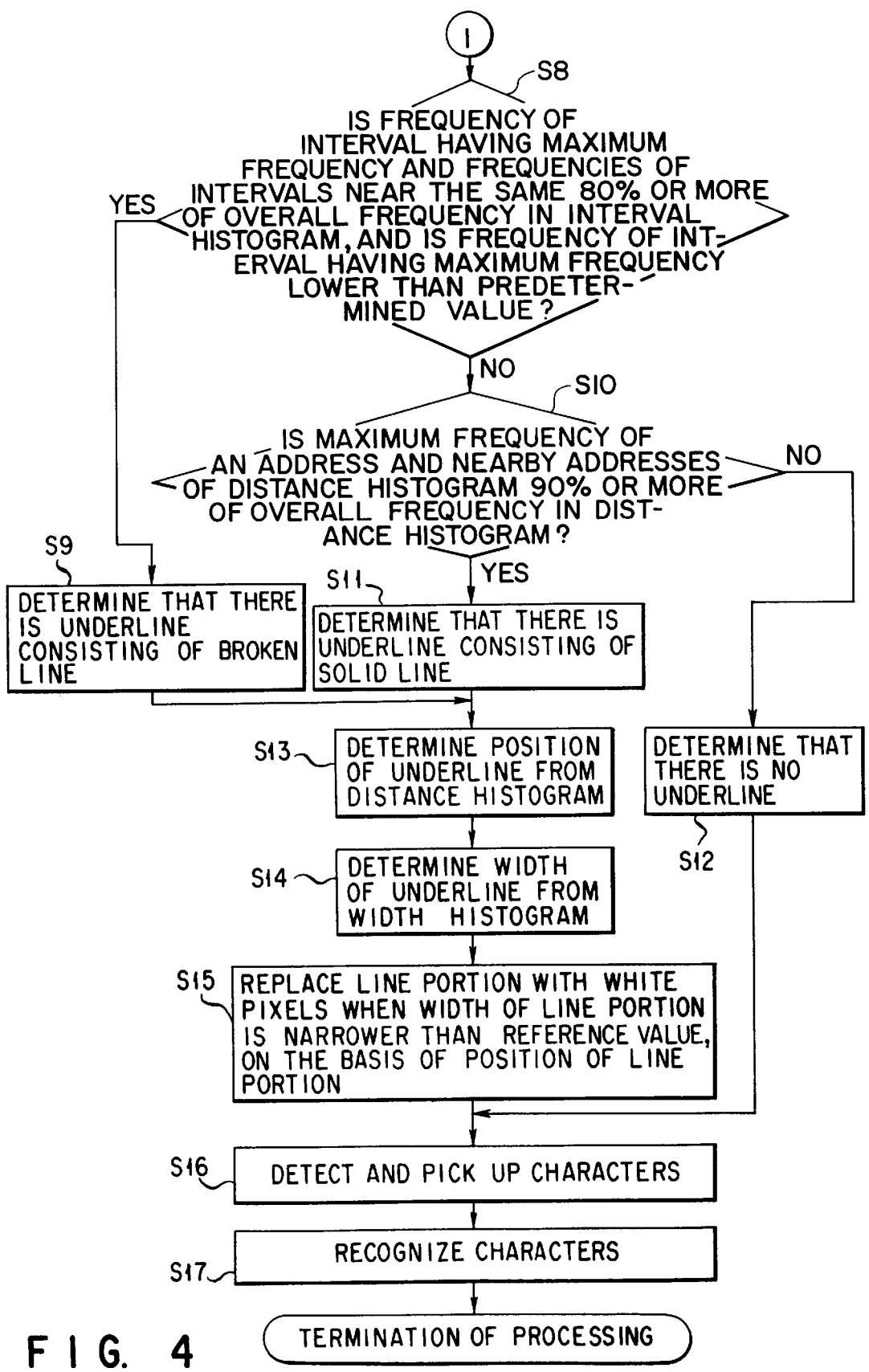

The operation of the first embodiment will be explained with reference to FIGS. 3 and 4.

First, an image on the postal matter P transferred in the direction indicated by the arrow, which includes the address character strings 12 and the underlines 13, is input by the image input section 4, then digitized by the digitizing section 5, and stored in the image memory 6 (step S1).

Subsequently, the character string detection/pickup section 7 obtains horizontal projection data D (as shown in FIG. 2) in a direction parallel to the address character strings (character rows) 12 on the basis of the image data stored in the image memory 6, and picks up an image (see FIG. 5) of the character string 12 including the underline 13 on the basis of the projection data D (step S2).

Thereafter, the underline detection/removal section 8 detects and removes the underline 13 from the character string image picked by the character string detection/pickup section 7. More specifically, as regards the picked character string image, the distance from the lower end b of the character string image (see FIG. 5) to each first black pixel of the image found in the vertical direction (i.e. in the direction perpendicular to the character string) is calculated, thereby preparing projection data on the distances (step S3). (In the case where the character string is inverted, the distance from the upper end a of the character string image to each first black pixel found in the vertical direction (i.e. in the direction perpendicular to the character string) may be calculated, thereby preparing projection data on the distances from the upper end a.)

Figure 6A:
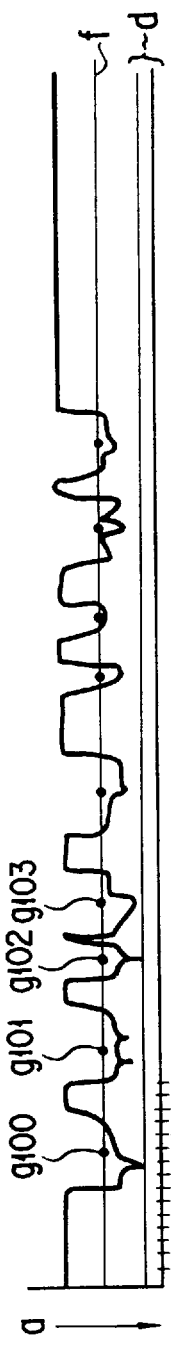
FIG. 6A shows an example of projection data obtained when the character string image is projected from the upper end of the image in FIG. 5.
Figure 6B:
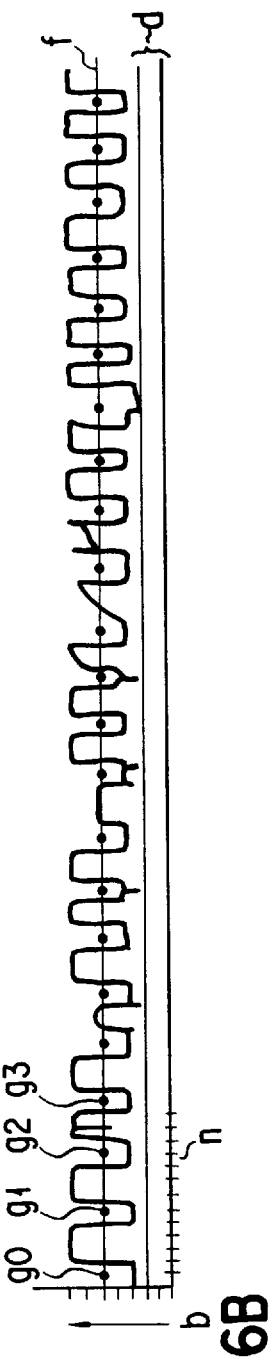
FIG. 6B shows an example of projection data obtained when the character string image is projected from the lower end of the image in FIG. 5.

To prepare the projection data, the height c of the picked character string image is calculated, and the middle position O of the height c in the vertical direction (i.e. in a direction perpendicular to the character string 12) is calculated by division (c/2). Then, predetermined horizontal positions n are set at regular intervals, and the distance from the lower end b to a first black pixel found in the vertical direction is calculated in each horizontal position n. As a result, projection data on the distances from the lower end b is prepared as shown in FIG. 6B. (Similarly, in the case where the character string is inverted, predetermined horizontal positions n are set at regular intervals, and the distance from the upper end a to the first black pixel found in the vertical direction is calculated in each horizontal position n, thereby obtaining projection data on the distances from the upper end a as shown in FIG. 6A, which is used to detect a linear line.)

Where no black pixel is found in the vertical direction, the distance between the level b or a and the vertically middle position O is calculated.

All pieces of the thus-obtained projection data indicative of the distances from the lower end b are sliced using a predetermined threshold value f (i.e. each piece of the projection data is compared with the threshold value f), so as to define "slice 0" areas, and the middle point of each "slice 0" area is calculated (step S4).

Specifically, as is shown in FIG. 6B, the threshold value f is calculated by dividing, by 2, a value which is obtained by subtracting a margin d from the vertically middle position O of the character string 12 (i.e. f=(O−d)/2). Then, each distance is compared with the threshold value f, and an area with a distance value smaller than the threshold value f is set to the "slice 0" area. The middle points g0, g1, g2, . . . of all "slice 0" areas are determined.

Thereafter, the interval between each pair of adjacent middle points is calculated, and a histogram concerning the relationship between the interval and the frequency as shown in FIG. 7B (step S5), is prepared. Specifically, the interval (g1-g0), (g2-g1), . . . between each pair of adjacent middle points gn is calculated to prepare the FIG. 7B histogram concerning the intervals of the middle points.

Figure 15:
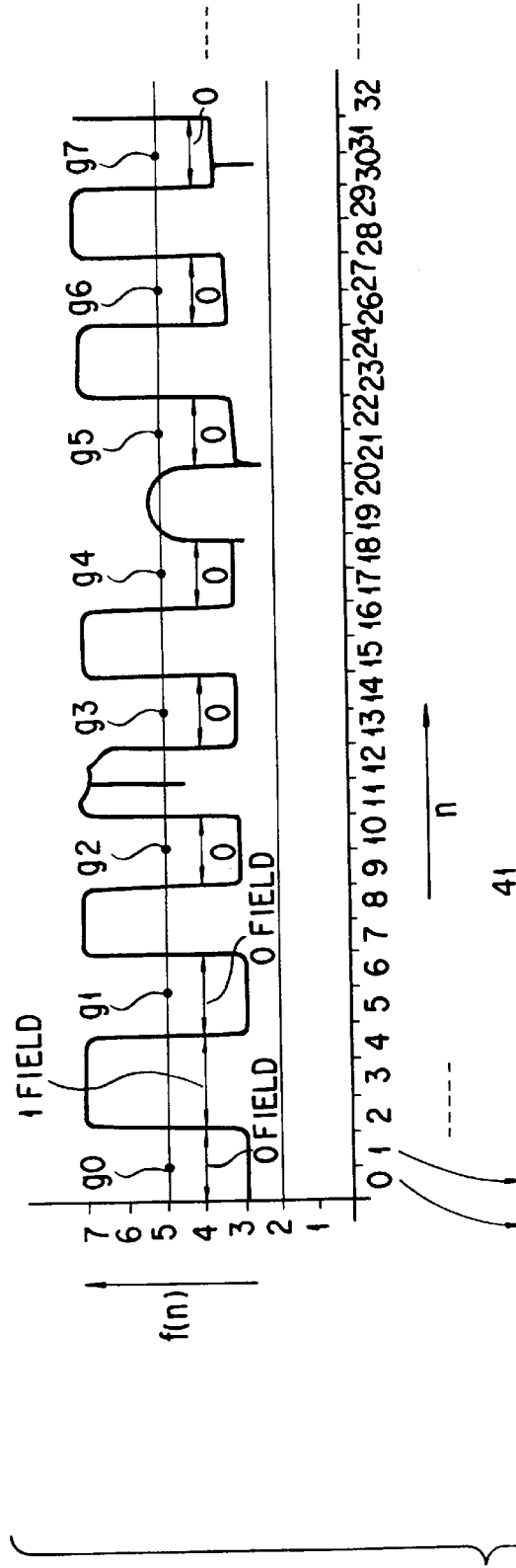
FIG. 15 is a view, useful in explaining the process according to the invention for obtaining the interval between the center points of each adjacent pair of "slice 0" areas in the character string image.
Figure 16:
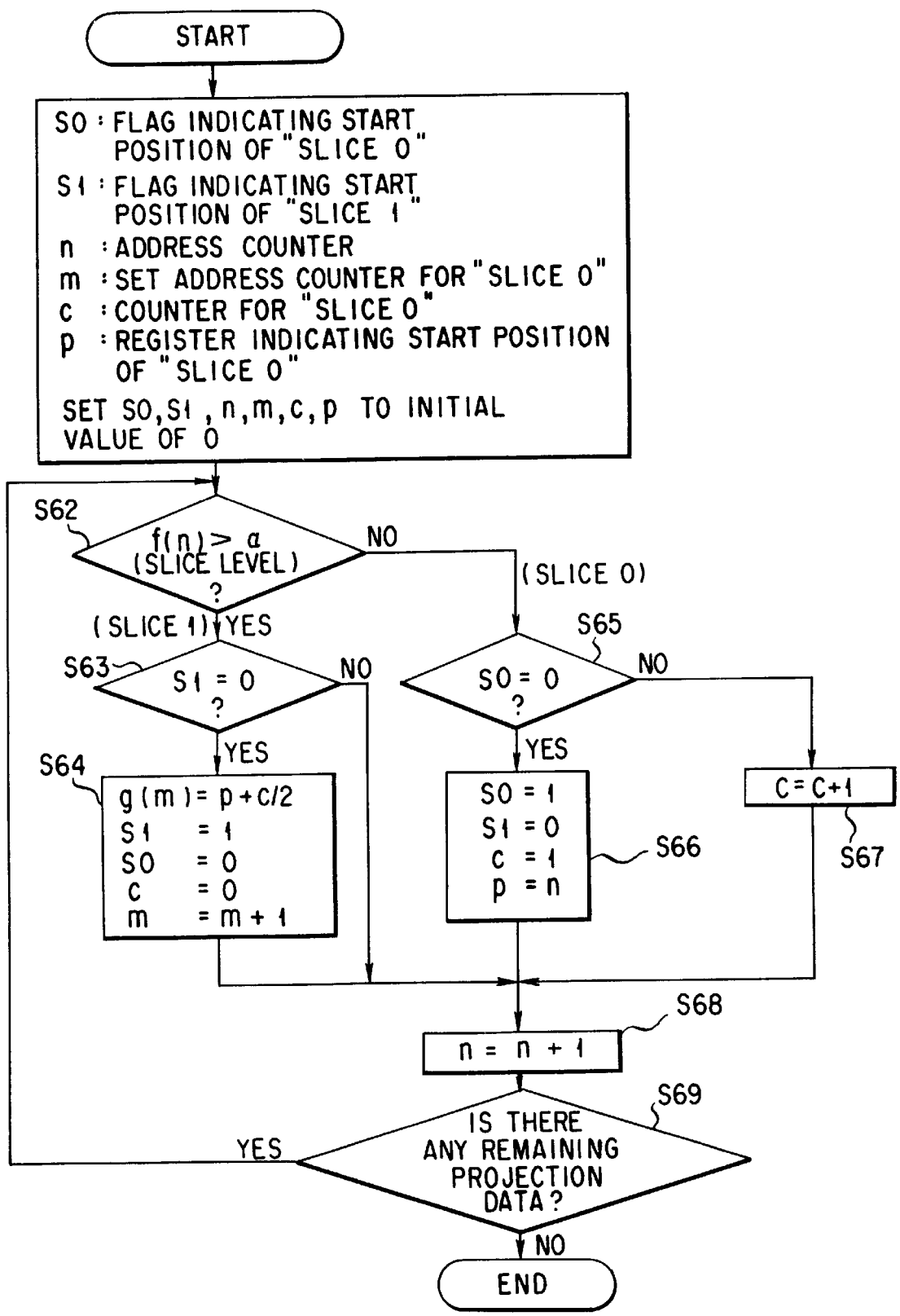
FIG. 16 is a flowchart according to the invention for obtaining the interval between the center points of each adjacent pair of "slice 0" areas in the character string image.

Referring then to FIGS. 15 and 16, the process for obtaining a pitch histogram on the basis of the projection data will now be explained in detail.

FIG. 15 is a view, useful in explaining the process for obtaining the interval between the middle points of each pair of adjacent "slice 0" areas of the character string image, which is the feature of the invention. FIG. 16 is a flowchart for obtaining the interval between the middle points of each pair of adjacent "slice 0" areas of the character string image, which is the feature of the invention.

In FIG. 15, table 41 shows the process for converting the projection data to a plurality of intervals P(m) for forming a histogram.

At each horizontal position indicated by an address n, a corresponding piece of projection data is expressed by a distance value f(n) which indicates the distance from the lower end b. The distance value f(n) represents one of 8 distance values (i.e. "n" represents 1, 2, . . . or 8). Suppose that a middle value 5 between a maximum value 7 and a minimum value 3 is set as a "slice level α". Further, the area is determined to be the "slice 0" area when its distance value is lower than a predetermined slice level, and to be a "slice 1" area when its distance value is higher than the predetermined slice level. A flag s0 is set to indicate the "slice 0" area, and a flag s1 is set to indicate the "slice 1" area. Moreover, an address counter n is used to indicate, with the address n, in which one of horizontal positions set at regular intervals each slice area is located. A counter c is used to indicate the number of each "slice 0" area. A register p is used to indicate the start position of the "slice 0" area. 0 is set as the initial value of each of s0, s1, n, m, c and p (step S61).

Then, each distance value f(n) is compared with the slice level α (step S62). If the distance value f(n) set for a certain slice area is higher than the slice level, the slice area is recognized as the "slice 1" area.

Figure 5:
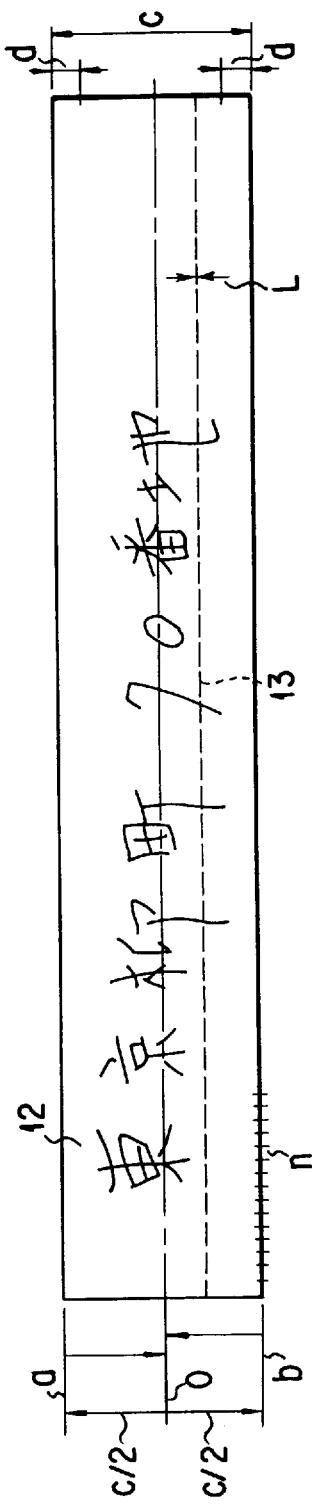
FIG. 5 shows an example of a character string image detected and picked up.

The "slice 1" area indicates an area in which there is a long distance between the lower end b and the first black pixel (see FIG. 5). This means that the "slice 1" area contains no broken line 13 which is drawn near the lower end b. Therefore, it is considered that in the "slice 1" area, there is a character (or a black pixel) with a long distance from the lower end b, or there is no character (black pixel).

On the other hand, the "slice 0" area indicates an area in which there is only a short distance between the lower end b and the first black pixel. This means that the "slice 0" area contains the broken line 13, or that in this area, a character reaches a portion very near the lower end b.

If a certain slice area is recognized as the "slice 0" area, it is determined whether or not the flag s0 is 0 (step S65). If the flag s0 is 1, it is determined that the "slice 0" areas are formed on a continuous basis, and the value of the counter c which indicates the number of the "slice 0" area is incremented by 1. In other words, the value of the counter c indicates how large the "slice 0" area is, and the value of the counter c is incremented each time it is determined that the "slice 0" area continues.

If the flag s0 is not 1, i.e. if the flag s0 is 0, it is determined that the certain slice area is shifted from the "slice 1" area to the "slice 0" area. At this time, the flag s0 is set to 1, the flag s1 to 0, the counter c to 1, and the register p, which indicates the start position of the "slice 0" area, to n.

Thereafter, the value of the address counter n is incremented (step S68). If all pieces of the projection data have not been processed (step S69), the comparison with the slice level α is repeated (step S62).

If it is determined in the step S62 that the present slice area is the "slice 1" area, it is determined in the step S63 whether or not the flag s1 is 0. If s1=1, the slice area is determined to be a "slice 1" area continuous to the adjacent "slice 1" area. On the other hand, if s1=0, the present slice area is determined to be where the "slice 0" area is shifted to the "slice 1" area.

Then, to obtain the center point gm of the "slice 0" area, a calculation of g(m)=(p+c)/2 is performed. If the center point g is 0, a value of 0.5 is calculated from g(0)=(0+1)/2. s1 is set to 1, s0 to 0, the value of the counter c for the "slice 0" area to 0, and the value of a counter m for the "slice 0" area to m+1 (step S64).

Moreover, in table 41, each interval P(m) is set to 5, 4, 4, 4, 4, 5, . . . by just performing subtraction between each pair of adjacent center points gm of 0.5, 5.5, 9.5, 13.5, 17.5, 21.5, 26.5, . . .

A histogram as shown in FIG. 7B is prepared on the basis of the calculated intervals P(m) of each pair of adjacent center points gm of the "slice 0" areas (step S5).

Then, a histogram concerning the distance between the lower end b and each first black pixel is prepared on the basis of projection data as shown in FIG. 6B which is obtained when the character string is viewed from the lower end b (step S6). Specifically, a histogram as shown in FIG. 8A is prepared, in which a peak value T2 indicates the position of the broken line 13.

Subsequently, a histogram concerning the width of the first black pixels which are arranged on a continuous basis (the number of the black pixels is L) is prepared (step S7). Specifically, a histogram as shown in FIG. 9 is prepared, in which a maximum value R indicates the width of the underline 13.

In steps S8–S12, whether or not there is an underline, or whether the underline is a solid line or a broken line is determined on the basis of the FIG. 7B histogram concerning the intervals of the center points and the FIG. 8A histogram concerning the distance.

FIG. 7A shows a histogram concerning the interval of each pair of the adjacent center points of the "slice 0" areas of a character string image which includes no broken line. FIG. 7B shows a histogram concerning the interval of each pair of the adjacent center points of the "slice 0" areas of a character string image which includes a broken line as shown in FIG. 6B.

FIG. 8A shows a histogram concerning the distance between the lower end and each black pixel of a character string image which includes no solid line. FIG. 8B shows a histogram concerning the distance between the lower end and each black pixel of a character string image which includes a solid line.

In a step S8, it is determined whether or not in the FIGS. 7A and 7B histograms concerning the interval, the sum of the maximum frequency and its vicinity frequency (within+1 of the maximum frequency) is more than about 80% of the overall frequency, and whether or not the interval corresponding to the maximum frequency is lower than a predetermined value. If the answer to the question of the step S8 is YES, the program proceeds to a step S9, where it is determined there is a broken underline, followed by the processing of a step S13. If, on the other hand, the answer to the question of the step S8 is NO, the program proceeds to the step S10.

If in the step S8, a histogram as shown in FIG. 7B, in which the frequency concentrates in a small range, is obtained, the maximum value T1 indicates the constant pitch of the broken line 13 in FIG. 5. In other words, the fact that the interval P(m) of each pair of adjacent center points gm is substantially concentrated on the value indicated by the maximum value T1 means that the "slice 0" areas are arranged at regular intervals, i.e. that a broken line exists. Since in general, the broken line is drawn in positions lower than the positions of address characters, the line portions of the broken line are projected at regular intervals in positions very near the lower end of the character string image. In light of this, setting a slice level to detect "slice 0" areas enables "slice 0" areas to be found at a predetermined pitch where a broken line exists.

On the other hand, in the case where a histogram concerning the intervals P(m) of the center positions gm of the "slice 0" areas is prepared after a character string image which contains no broken line 13 is subjected to similar processing, the intervals P(m) have different values and do not concentrate in a small range as shown in FIG. 7A. Thus, detecting whether or not there is a concentration of the frequency of the intervals P(m) can determine whether a character string image contains a broken line.

Furthermore, the reason why it is determined whether the interval is lower than a predetermined value is to distinguish a broken line from characters printed using a word processor, etc. If the address characters are printed by a mechanical method using a word processor, etc., it is also possible that "slice 0" areas are arranged at regular intervals. In this case, it is hard to distinguish a broken line from such word processor characters. Since, however, the pitch of word processor characters is much larger than that of a general broken line, erroneous recognition can be avoided by comparing the pitch obtained from a histogram with a predetermined reference value indicative of the pitch of a general broken line.

In the step S10, it is determined whether or not a solid line is contained in a character string image. When the solid line is contained in the character string image, almost all of the first black pixels from the lower end must concentrate in a position very near the lower end. If the maximum frequency of the histogram is, for example, about 90% or more of the overall frequency, it is determined that a solid line exists. FIG. 8B shows a histogram obtained when a solid line exists. In this figure, the maximum frequency value T3 indicates the existence of a solid line. FIG. 8A shows a histogram obtained when a broken line exists as shown in FIG. 5, in which the maximum frequency value T2 indicates the existence of a broken line. In this case, however, the maximum frequency value obviously does not occupy 90% or more of the overall frequency.

In other words, in the case of the FIG. 8A histogram, it is determined whether or not the sum of the maximum frequency and its vicinity frequency (within +1 of the maximum frequency) is, for example, more than about 90% of the overall frequency. If the answer to this question is YES, the program proceeds to the step S11, where it is determined that there is a solid underline, followed by the step S13. If the answer is NO, the program proceeds to the step S12, where there is no underline, followed by a step S16 which will be explained later.

It is a matter of course that if determination as to the histogram concerning the intervals is not performed, and only determination as to the histogram concerning the distances is performed to detect a solid line, the solid line can be more efficiently detected.

In the step S13, the maximum value T2 is detected on the basis of the FIG. 8A histogram concerning the distances, to determine the position Lb of the detected underline (see FIG. 10A). In the next step S14, the width La of the detected underline is obtained on the basis of the histogram concerning the width of first black pixels from the lower end, shown in FIG. 9. That is, the line width La is determined from the maximum value T4. In a step 15, if the line width La determined in the step S14 is higher than a predetermined reference value, the detected underline is considered part of a character and maintained as it is. If, on the other hand, the line width La is lower than the predetermined reference value, the underline is deleted by replacing the line width La with white pixels (see FIG. 10B).

If, as shown in FIG. 2, part of a character such as " ", "", "7" or " " contacts the underline 13, the underline 13 is deleted by comparing the position of a portion of the underline with the position of that portion of the underline which is deleted previously. This is because the underline is generally drawn at the same level.

After deleting the underline 13, the character detection/pickup section 9 detects and picks up each character of the character string image with no underline 13 (see FIG. 10B) (step S16). In the next step S17, the character recognition section 10 recognizes each character picked by the character detection/pickup section 9 and outputs a recognition result, followed by the termination of the processing.

As described above, in the first embodiment, a character string image including an underline is picked up from an input postal matter, and projection data is prepared which indicates the distance between the lower end of the image and the lower end of each character or each portion of the underline. Then, all the pieces of the projection data are compared with a predetermined threshold value, thereby defining "slice 0" areas which contain no characters or underline portions. The center point of each "slice 0", area is calculated, and a histogram concerning the interval of each pair of adjacent "slice 0" areas is prepared. If concentration of frequency is found in the histogram concerning the intervals, it is considered that a broken line exists. This is because the existence of the broken line is understood from the fact that "slice 0" areas exist at regular intervals.

The first embodiment can be modified as follows:

Projection data indicative of the distance from the upper end a of a character string image to each first black pixel of the image found in the vertical direction is prepared, as well as the above-described projection data indicative of the distance from the lower end b to each first black pixel found in the vertical direction. Then, "slice 0" areas from the upper end are specified, and the interval between the center points of adjacent "slice 0" areas is calculated. Referring to FIG. 6A, the intervals between the center points g100, g101, g102, . . . are calculated to detect the intervals between characters in the character string. Thereafter, the intervals obtained with respect to the lower end are compared with the intervals obtained with respect to the upper end. If the average of the former intervals is lower than that of the latter intervals, it is considered that the intervals with respect to the lower end indicate the existence of a broken line.

The comparison between the intervals with respect to the lower end and the intervals with respect to the upper end can avoid erroneous recognition which may occur in the case of regular address characters as printed by a word processor, etc. In this case, the address characters may well be misrecognized as a broken line, since the address characters drawn by the word processor, etc. are arranged very regularly, which results in detection of regular "slice 0" areas and hence regular intervals between the center points of the "slice 0" areas.

In the case where no broken line is detected, a distance histogram with respect to the lower end is prepared. If a concentration of more than a predetermined value is detected in the distance histogram, it is determined that a solid line exists.

When a broken line or a solid line has been detected, the position and width of the line is detected, thereby replacing the broken line or the solid line with white pixels to delete the same.

The above-described methods enable a line under a character string to be detected and removed accurately and efficiently, even where a lower portion of a character contacts the underline (broken or solid line), even where the character string inclines, or even where the underline has cut portions due to noise. As a result, characters can be detected and picked up in a reliable manner, and accordingly accurate character reading can be performed.

A second embodiment of the invention will now be explained.

Figure 11:
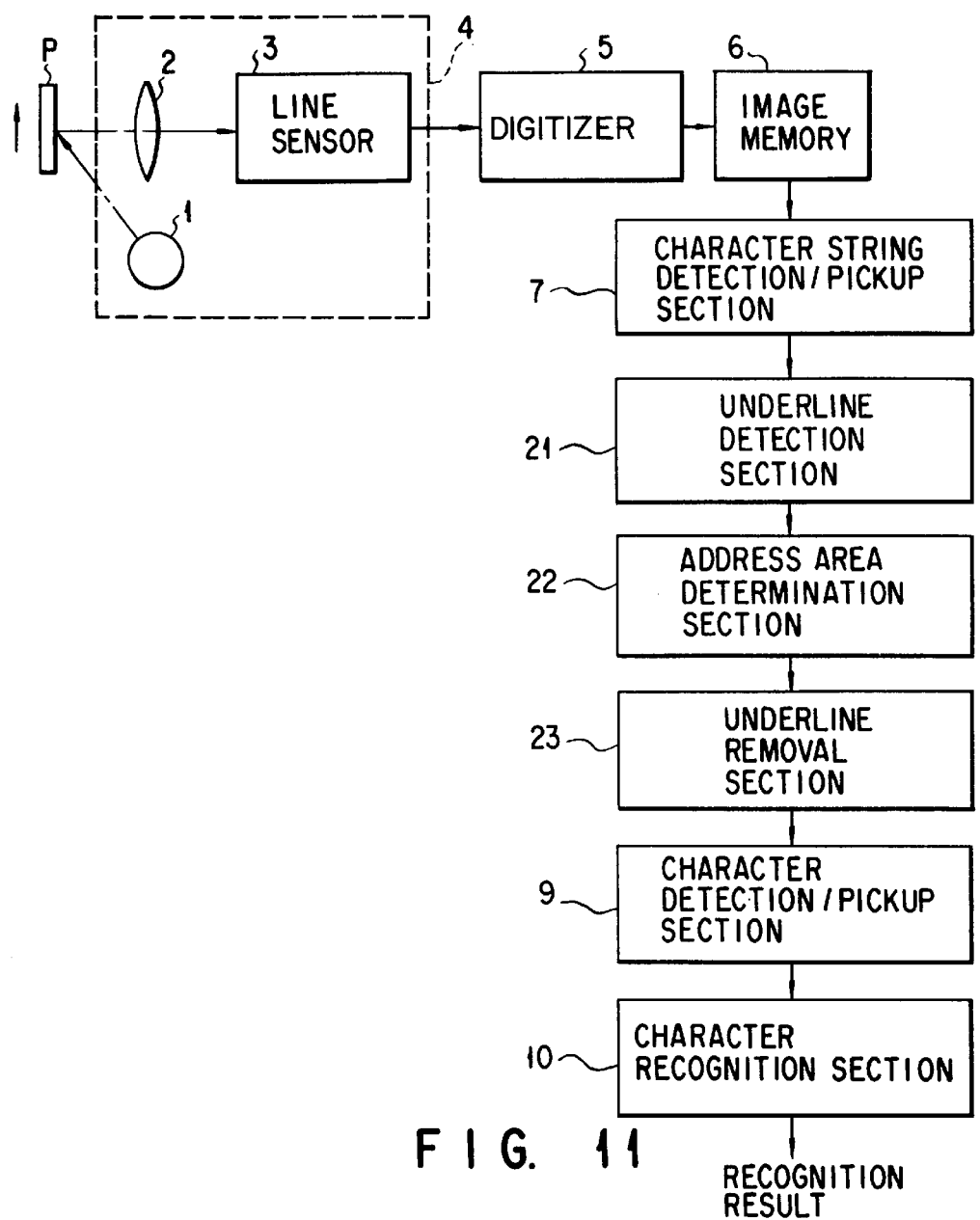
FIG. 11 is a schematic block diagram, showing a character reading apparatus to which linear line detection/removal apparatuses and an address area determination apparatus according to a second embodiment of the invention are applied.

FIG. 11 is a schematic block diagram, showing a character reading apparatus used as an address character reading apparatus for reading address data on a postal matter, to which linear line detection/removal apparatuses and an address area determination apparatus according to the second embodiment of the invention are applied. In FIG. 11, elements similar to those in FIG. 1 are denoted by corresponding reference numerals.

The character reading apparatus according to the second embodiment comprises a light source 1 for illuminating a postal matter P as shown in FIG. 2; an optical system 2 such as a lens; a sensor 3; an image input section 4 for inputting an image on the postal matter P; a digitizing section 5 for digitizing a signal output from the line sensor 3; an image memory 6 for storing digitized image data output from the digitizing section 5; a character string detection/pickup section 7 for detecting and picking up, from the image data stored in the image memory 6, an image of the character string (i.e. the character row) including the underline; an underline detection section 21 for detecting an underline from the character string image picked by the character string detection/pickup section 7; an address character area determination section 22 for determining, when the underline is detected, that the underline is located in an address area in which address data is recited; an underline removal section 23 for removing the underline detected by the underline detection section 21; a character detection/pickup section 9 for picking up characters one by one from the character string with the underline removed by the underline removal section 23; and a character recognition section 10 for recognizing each character picked by the character detection/pickup section 9.

Figure 12:
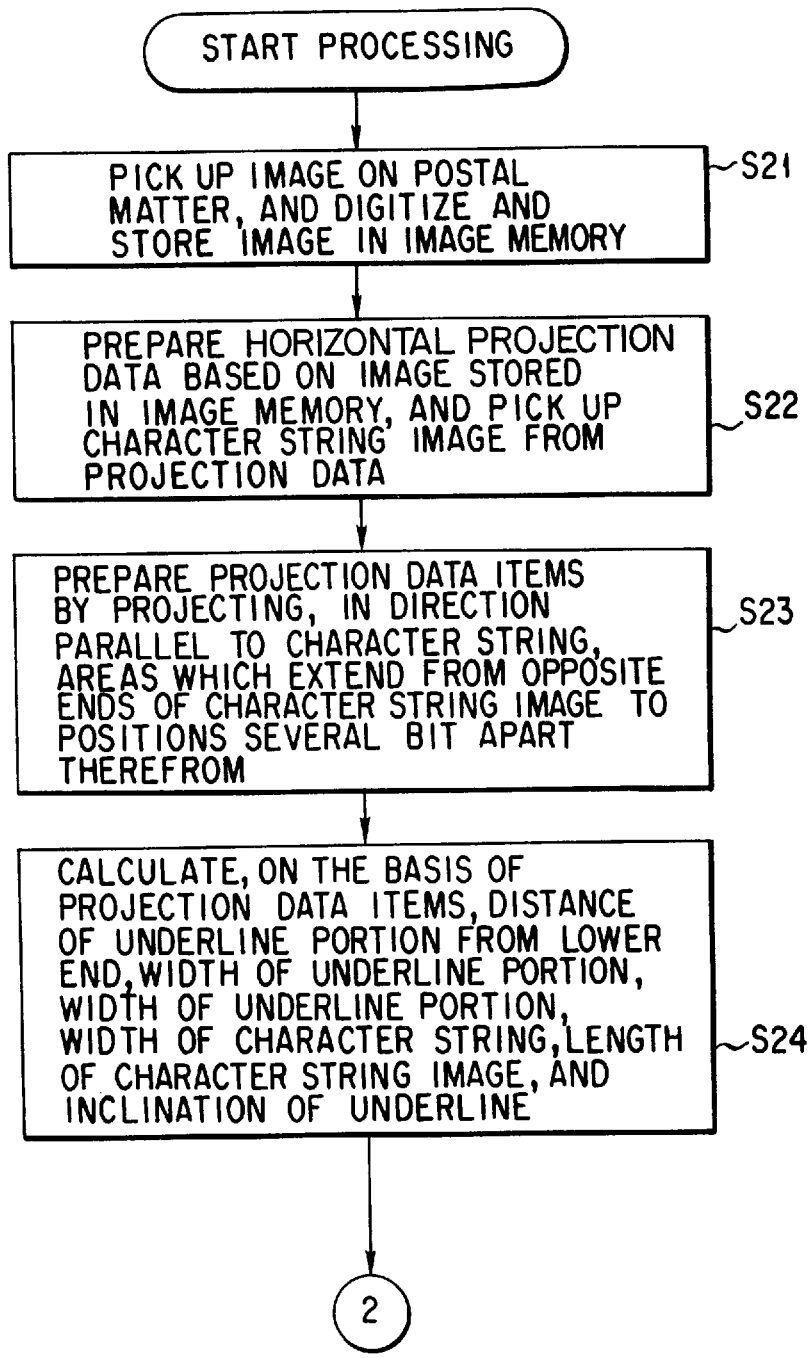
FIGS. 12 and 13 show a flowchart useful in explaining the operation of the apparatus of FIG. 11.
Figure 13:
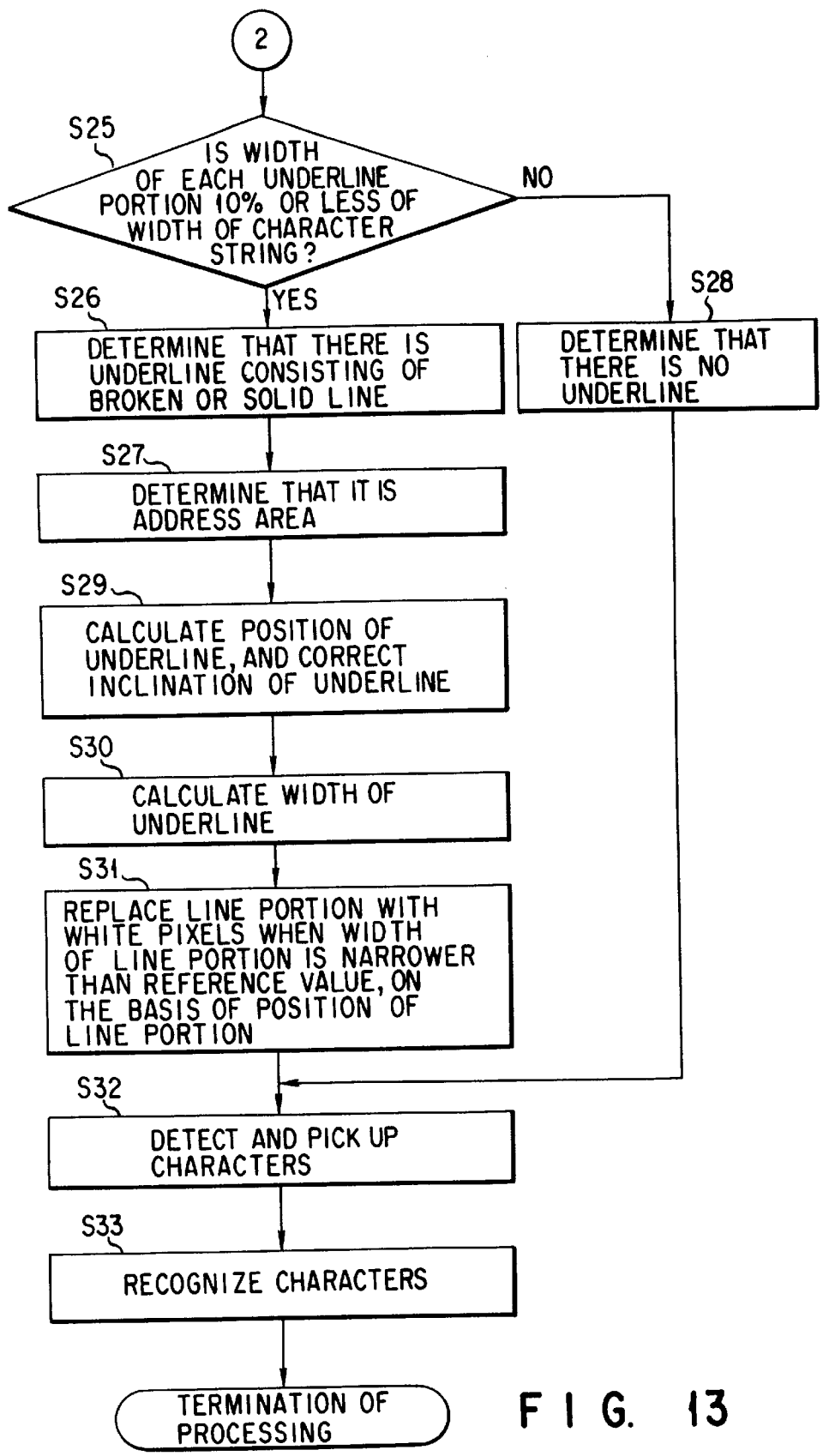

The operation of the second embodiment will be explained with reference to the flowchart shown in FIGS. 12 and 13.

First, an image on the transferred postal matter P, which includes the address character strings 12 and the underlines 13, is input by the image input section 4, then digitized by the digitizing section 5, and stored in the image memory 6 (step S21).

Subsequently, the character string detection/pickup section 7 obtains horizontal projection data D (as shown in FIG. 2) parallel to the address character strings (character rows) 12 on the basis of the image data stored in the image memory 6, and picks up an image (see FIG. 14) of the character string 12 including the underline 13 on the basis of the projection data D (step S22).

Figure 14:
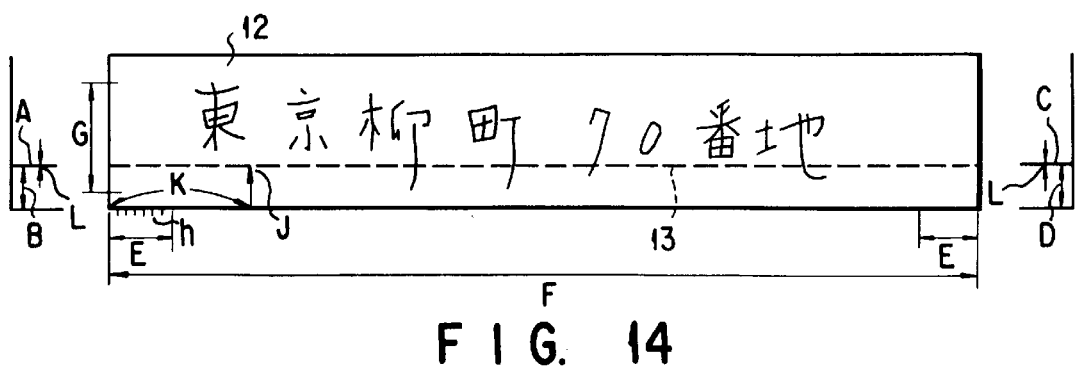
FIG. 14 is a view, useful in explaining an example of a character string image detected and picked up, and horizontal projection data indicative each of opposite end portion of the postal matter.

Thereafter, the underline detection section 21 detects the underlines 13 from the character string image picked by the character string detection/pickup section 7. More specifically, as shown in FIG. 14, projection data items A and C are prepared (step S23). The projection data items A and C are obtained by projecting, in the horizontal direction, those areas of the picked character string image which extend from the opposite ends of the image in the direction of the character string 12, to positions E a few bits apart from the ends, respectively.

Then, the distances B and D from the lower end of the character string image to respective first black pixels (which constitute the underline 13) found in the vertical direction, and the widths L of the projected portions of the underline 13 are determined on the basis of the projection data items A and C. Further, the width G of the character string 12 and the length F of the character string image are determined on the basis of the picked character string image. From the values B, D, and F, the inclination (B−D)/F of the underline 13 is calculated (step S24).

In the next step S25, it is determined whether or not the underline widths L are, for example, about 10% or less of the character string width G. If the answer to the question in the step S25 is YES, it is determined in a step S26 that there is an underline consisting of a broken line or a solid line, and the program proceeds to a step S27. If, on the other hand, the answer to the question in the step S25 is NO, it is determined in a step S28 that there is no underline, followed by the program proceeding to a step S32, which will be explained later.

In the case where an underline (either a broken or a solid line) is drawn, opposite end portions of the character string area generally include only the underline and no characters. In the second embodiment, the underline is detected only by examining the opposite end portions of the character string area. If the detected width is very narrow, it is determined that there is an underline and not a character. Thus, the determination of the underline is carried out by the comparison of the detected width with the character string width.

In the step S27, it is determined by the address area determination section 22 on the basis of the detection of the underline in the step S26, that the underline-existing area is the address area in which the character string 12 indicative of address data is recited. The program then proceeds to a step S29.

The underline removal section 23 removes the detected portion of the underline 13 as follows:

In the step S29, the position J of the detected portion of the underline 13 in the vertical direction (perpendicular to the character string 12) is determined on the basis of the distances B and D from the lower end, the length F of the character string image obtained in the step S24, and the distance K from the left side of the character string image (see FIG. 14). At this time, the inclination of the underline 13 beforehand calculated in the step S24 is detected. Moreover, the coordinates of each portion of the underline 13 can be directly calculated from the equation J=B+{(B−D)/F}×K.

In a step S30, the width of each portion of the underline 13 is determined on the basis of the position J of the portion of the underline 13 determined in the step S29 and the width L of the portion of the underline 13 determined in the step S24. If the determined width of the portion of the underline 13 is higher than a predetermined reference value, it is considered that the portion of the underline 13 contacts a character, and this underline portion is not deleted. If, on the other hand, the width of the underline portion is lower than the predetermined reference value, this portion is deleted by replacing, with white pixels, black pixels forming the underline width at the position J determined in the step S29 (step S31).

The deletion of the underline 13 on the basis of the position J and width of the underline 13 is similar to that in the first embodiment.

After the underline 13 is deleted, the character detection/pickup section 9 detects and picks up each character in that character string image in the address area, from which the underline 13 has been deleted (step S32). Then, the character recognition section 10 recognizes each character picked by the section 9 (step S33) and outputs the recognition result, followed by the termination of the program. The character detection/pickup processing and the character recognition processing are performed in the same manner as in the first embodiment.

As explained above, in the second embodiment, a character string image including an underline is detected from an image on an input postal matter, and horizontal projection data items concerning opposite end portions of the character string image are prepared. Further, it is determined, from the horizontal projection data items, whether or not there is an underline in each of the opposite end portions of the character string image. If it is determined that there is an underline, it is determined that the character string is underlined, and each portion of the underline is deleted from a corresponding detected portion of the character string image.

By virtue of the above structure, in the second embodiment, the underline can be detected and removed accurately and efficiently, even if a lower portion of a character contacts the underline, even if the character string inclines, or even if the underline is a solid line or a broken line or includes cut portions due to noise. As a result, characters can be detected and picked up in a reliable manner, and accordingly accurate character reading can be performed.

Although in the second embodiment, a line drawn under a character string is detected and removed, the method employed in this embodiment can be also used to detect and remove a line drawn above the character string.

Moreover, although in the second embodiment, a line (either a solid line or a broken line) drawn under an address character string as address data recited in an address area of a postal matter is detected and removed, the invention is not limited to this, but also used to detect and remove a line drawn under (either a solid line or a broken line) drawn under a character string recited on a negotiable instrument paper, etc.

Thus, the invention can provide a linear line detection apparatus capable of efficiently and reliably detecting a linear line drawn along a character string even if the linear line is a solid line or a broken line or contains a cut portion due to noise.

Furthermore, the invention can provide a linear line detection apparatus capable of efficiently and reliably detecting and removing the linear line, thereby performing accurate reading of characters.

In addition, the invention can provide an address area determination apparatus capable of accurately determining an address area of a postal matter.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A line image detection apparatus comprising:
   means for imaging at least a portion of a document to form an input image, the input image including an image of a character string and a straight line being under the character string, the image of the character string and the straight line being constituted by black pixels;

means for detecting and recognizing, from the input image, the image of the character string and the straight line, the image of the character string and the straight line being located in an area of the input image being between a lower end and an upper end of the input image;

means for forming a projection image based on a distance from the lower end of the input image to each first black pixel found in the input image in a vertical direction;

means for comparing the distance with a predetermined threshold value;

means for defining a plurality of "slice 0" areas having the distance being lower than the predetermined threshold value;

means for determining an interval distribution of a corresponding interval between each adjacent pair of the "slice 0" areas determined by the defining means; and means for detecting the straight line in the input image based on the interval distribution.

2. The line image detection apparatus according to claim 1, wherein the interval distribution determining means includes:

means for determining a center point of each of the "slice 0" areas; and means for detecting an interval between each adjacent pair of the center points.

3. The line image detection apparatus according to claim 1, wherein the straight line detecting means includes:

means for preparing an interval histogram concerning the corresponding intervals between each of the adjacent pair of the "slice 0" areas; and means for determining that the detected straight line is a broken line, when in the interval histogram, a ratio of a frequency of one interval value to a sum of frequencies of all interval values is higher than a predetermined value.

4. The line image detection apparatus according to claim 2, wherein the straight line detecting means includes means for determining that the detected straight line is a broken line, when a ratio of a sum of frequencies of two interval values, corresponding to adjacent intervals between adjacent pairs of the center points, to a sum of frequencies of all interval values is higher than a predetermined value.

5. The line image detection apparatus according to claim 1, wherein the straight line detecting means includes:

means for preparing an interval histogram concerning the interval between each of the adjacent pair of the "slice 0" areas; and means for determining that the detected straight line is a broken line, when in the interval histogram, frequency of one interval value is 80% or more of a sum of frequencies of all interval values.

6. The line image detection apparatus according to claim 1, further comprising:

means for obtaining the distance from the lower end of the input image to each first black pixel, and preparing a distance histogram concerning the distance; and means for determining that the detected straight line is a solid line, when in the distance histogram, a ratio of a frequency of one distance value to a sum of frequencies of all distance values is higher than a predetermined value.

7. The line image detection apparatus according to claim 6, wherein the solid line determinating means includes means for determining that the detected straight line is a solid line, when in the distance histogram, a ratio of a sum of frequencies of two continuous distance values to the sum of the frequencies of all distance values is higher than a predetermined value.

8. The line image detection apparatus according to claim 6, wherein the solid line determinating means includes means for determining that the detected straight line is a solid line, when in the distance histogram, the frequency of one distance value is 90% or more of the sum of the frequencies of all distance values.

9. The line image detection apparatus according to claim 8, wherein the solid line determinating means includes means for determining that the detected straight line is a solid line, when in the distance histogram, the sum of the frequencies of two continuous distance values is 90% or more of the sum of the frequencies of all distance values.

10. The line image detection apparatus according to claim 1, further comprising:

means for preparing a straight line width histogram concerning a width of each portion of the straight line in the projection image, when the straight line detection means has detected the straight line; and removal means for detecting a position and the width of each portion of the straight line based on the straight line width histogram so as to remove the straight line.

11. The line image detection apparatus according to claim 10, further comprising means for recognizing characters in the input image from which the straight line is removed by the removal means.

12. The line image detection apparatus according to claim 1, wherein the straight line detecting means includes:

means for forming a second projection image based on a second distance from the upper end of the input image to each first black pixel found in the input image;

means for comparing the second distance with a second predetermined threshold value, so as to define a plurality of second "slice 0" areas having the second distance being lower than the second predetermined threshold value;

means for determining a center point of each of the second "slice 0" areas;

means for detecting a second interval between each adjacent pair of the center points of the second "slice 0" areas;

means for preparing a first interval histogram concerning the intervals of the "slice 0" areas;

means for preparing a second interval histogram concerning the second intervals; and means for determining that the detected straight line is a broken line, when a ratio of a frequency of a first interval value which is highest in the first interval histogram, to a frequency of all interval values is higher than a predetermined value, and when the first interval value is lower than a second interval value with a highest frequency in the second interval histogram.

13. A line image detection apparatus comprising:

means for imaging at least a portion of a document to form an input image, the input image including an image of a character string and a straight line being under the character string, the image of the character string and the straight line being constituted by black pixels;

means for detecting and recognizing, from the input image, the image of the character string and the straight;

means for obtaining a distance from each of a plurality of points of a lower end of the input image, to each first black pixel in a vertical direction, and preparing a distance histogram concerning the distance; and means for determining that the detected straight line is a solid line, when in the distance histogram, a ratio of a frequency of a distance value, which is highest, to the sum of frequencies of all distance values higher than a predetermined value.

14. The line image detection apparatus according to claim 13, wherein the solid line determining means includes means for determining that the detected straight line is a solid line, when in the distance histogram, the frequency of the distance value, which is highest, is 90% or more of the sum of the frequencies of all distance values.

15. The line image detection apparatus according to claim 13, further comprising:

means for preparing a solid line width histogram concerning a width of each portion of a solid line in the input image, when the solid line determining means has determined that the solid line exists; and solid line removal means for detecting a position and the width of each portion of the solid line based on the solid line width histogram, and removing the solid line.

16. The line image detection apparatus according to claim 15, further comprising means for recognizing characters in the input image from which the solid line is removed by the solid line removal means.

17. A line image detection apparatus comprising:

means for imaging at least a portion of a document to form an input image, the input image including an image of a character string and a straight line being under the character string, the image of the character string and the straight line being constituted by black pixels;

means for detecting and recognizing, from the input image, an image of the character string and the straight line;

means for projecting only a first area and a second area, the first area being an area of a left portion of the input image including only a portion of the straight line up to a left and of the input image, the second area being an area of a right portion of the input image and including only another portion of the straight line up to a right end of the input image, so as to form projection images;

means for comparing a vertical width of projection data of each of the first and the second areas with a vertical width of the image of the character string;

means for determining that the input image includes the straight line, when a ratio of the vertical width of the projection data to the vertical width of the image of the character string is lower than a predetermined value;

means for detecting an inclination of the straight line based on the projection data, when the means for determining that the input image includes the straight line has determined that the straight line exists; and means for correcting the inclination of the straight line.

18. The line image detection apparatus according to claim 17, further comprising:

means for detecting a position and a width of the straight line included in the input image based on the projection data; and means for removing the straight line when the detected width is narrower than a predetermined width.

19. The line image detection apparatus according to claim 18, further comprising:

means for recognizing each character included in the input image with the straight line removed by the straight line removing means.

20. A method of detecting a line comprising:

imaging at least a portion of a document, including a character string and a straight line being under the character string, to form an input image; the character string and the straight line in the input image being constituted by black pixels;

detecting and recognizing, from the input image, an image of the character string and the straight line, the character string and the straight line being located in an area of the input image being between a lower end and an upper end of the input image;

forming a projection image based on a distance from the lower end of the input image to each first black pixel found in the input image in a vertical direction;

comparing the distance with a predetermined threshold value;

defining a plurality of "slice 0" areas having the distance being lower than the predetermined threshold value;

determining and interval distribution of a corresponding interval between each adjacent pair of the "slice 0" areas determined by the defining step; and detecting the straight line in the input image based on the interval distribution.

21. A method of detecting a line comprising:

imaging at least a portion of a document, including a character string and a straight line being under the character string, to form an input image; the character string and the straight line in the input image being constituted by black pixels;

detecting and recognizing, from the input image, an image of the character string and the straight line;

obtaining a distance from each of a plurality of points of a lower end of the input image to each first black pixel in a vertical direction, and preparing a distance histogram concerning the distance; and determining that the detected straight line is a solid line, when in the distance histogram, a ratio of a frequency of a distance value, which is highest, to the sum of frequencies of all distance values is higher than a predetermined value.

22. The method of detecting a line according to claim 21, wherein the step for determining that the detected straight line is the solid line comprises determining that the detected straight line is a solid line, when in the distance histogram, the frequency of the distance value, which is highest, is 90% or more of the sum of the frequencies of all distance values.

23. The method of detecting a line according to claims 21, further comprising:

preparing a solid line width histogram concerning a width of each portion of a solid line in the input image, when the step of determining that the detected straight line is the solid line has determined that the solid line exists; and detecting a position and the width of each portion of the solid line based on the solid line width histogram and removing the solid line.

24. The method of detecting a line according to claim 23, further comprising: recognizing characters in the input image from which the solid line is removed in the step of detecting the position and the width of each portion of the solid line.

25. A method of detecting a line comprising:

imaging at least a portion of a document, including a character string and a straight line being under the character string, to form an input image; the character string and the straight line in the input image being constituted by black pixels;

detecting and recognizing, from the input image, an image of the character string and the straight line;

projecting only a first area and a second area, the first area being an area of a left portion of the input image and includes only a portion of the straight line up to a left end of the input image, the second area being an area of a right portion of the input image and includes only another portion of the straight line up to a right end of the input image, so as to form projection images;

comparing a vertical width of projection data of each of the first and the second areas with a vertical width of the image of the character string;

determining that the input image includes the straight line when a ratio of the vertical width of the projection data to the vertical width of the image of the character string is lower than a predetermined value;

detecting an inclination of the straight line based on the protection data, when the determining step determines that the input image includes the straight line; and correcting the inclination of the straight line.

* * * * *